United States Patent
Ward et al.

(10) Patent No.: US 6,827,917 B1
(45) Date of Patent: Dec. 7, 2004

(54) PROCESS FOR OXIDATION OF AMMONIA

(75) Inventors: Andrew Mark Ward, Cleveland (GB);
Brett Albert Wolfindale, Cleveland (GB); Frank King, Cleveland (GB);
Bernard John Crewdson, Thirsk (GB)

(73) Assignee: Johnson Matthey PLC, London (GB)

( * ) Notice: Subject to any disclaimer, the term of this patent is extended or adjusted under 35 U.S.C. 154(b) by 0 days.

(21) Appl. No.: 09/334,986

(22) Filed: Jun. 17, 1999

Related U.S. Application Data

(63) Continuation of application No. PCT/CB97/03193, filed on Nov. 20, 1997.

(30) Foreign Application Priority Data

Dec. 20, 1996 (GB) .............................................. 9626516

(51) Int. Cl.$^7$ ............................................... C01B 21/26
(52) U.S. Cl. ........................................................ 423/404
(58) Field of Search ......................................... 423/404

(56) References Cited

U.S. PATENT DOCUMENTS

| | | | |
|---|---|---|---|
| 3,888,792 A | * | 6/1975 | Hughes ..................... 423/404 |
| 4,208,269 A | | 6/1980 | Gladrow et al. |
| 4,812,300 A | * | 3/1989 | Quinlan et al. ............. 423/404 |
| 5,149,516 A | | 9/1992 | Han et al. |

FOREIGN PATENT DOCUMENTS

| | | |
|---|---|---|
| EP | 0 468 127 | 1/1992 |
| EP | 0 513 413 | 11/1992 |
| EP | 0 525 677 | 2/1993 |

OTHER PUBLICATIONS

Database WPI Section Ch, Week 8923 Derwent Publications Ltd., London, GB; Class E36, AN 89-166028 XP002055431 & CN 86108985 A (Changchun Appl Chem), Apr. 20, 1988 abstract (Entire English Translation Included).

* cited by examiner

*Primary Examiner*—Wayne A. Langel
(74) *Attorney, Agent, or Firm*—Mayer Brown Rowe & Maw LLP

(57) ABSTRACT

A catalyst for oxidation reactions, particularly the oxidation of ammonia comprises oxides of (a) at least one element A selected from rare earths and yttrium, and (b) cobalt and element A being in such proportions that the element A to cobalt atomic ratio is in the range 0.8 to 1.2, at least some of said cobalt and element A oxides being present as a mixed oxide phase with less than 25% of the cobalt (by atoms) being present as free cobalt oxides, is disclosed. The catalyst may be supported on a secondary support in the form of an alkali-free alumina or lanthana wash coat on a primary support in the form of a mesh, gauze, pad, or monolith formed from a high temperature iron/aluminum alloy or a mesh, gauze, pad, monolith, or foam of a ceramic material.

8 Claims, No Drawings

PROCESS FOR OXIDATION OF AMMONIA

This is a continuation under 35 U.S.C. Section 120 of International application Ser. No. PCT/GB97/03193 filed on Nov. 20, 1997 which application designates the U.S.

This invention relates to ammonia oxidation. Ammonia oxidation is widely employed in the manufacture of nitric acid and hydrogen cyanide. In the manufacture of nitric acid ammonia is oxidised with air to nitric oxide, while in the manufacture of hydrogen cyanide a mixture of ammonia and methane (often as natural gas) is oxidised with air. In both processes, the gas mixture is passed at an elevated temperature over a catalyst to effect the oxidation. Side reactions, such as the formation of nitrogen or nitrous oxide, are undesirable. Consequently, in addition to good activity, the catalyst is required to have a good selectivity.

For many years the catalysts employed have been platinum sometimes alloyed with other precious metals, in the form of meshes or gauzes formed from the metal wire. Such catalysts have good activity and selectivity but suffer from the disadvantage that not only is the catalyst very expensive, but at the temperatures encountered, the metals exhibit an appreciable volatility and so gradually the metal is lost into the gas stream. While it is well known to provide downstream means to trap the volatilized metal so that it may be revered subsequently, because of the continual volatilization, the life of the catalyst is short and frequent replacement is necessary. Furthermore the recovery of the metals from the downstream trap and re-fabrication of the catalyst meshes or gauzes involves a considerable allocation of working capital.

It is therefore desirable to provide a replacement for such precious metal catalysts.

It is well known that cobalt oxide exhibits activity for ammonia oxidation. In order to improve the activity and selectivity there have been numerous proposals to incorporate various promoters such as rare earths into a cobalt oxide catalyst.

For example, it has been proposed in CN-A-86108985 to employ lanthana/ceria/cobalt oxide compositions of the general formula $La_{1-x}Ce_xCoO_3$ (where x is from 0 to 1) made by a specified co-precipitation route as ammonia oxidation catalysts. Such materials were reported as having good activity and selectivity when tested on a small scale, although there is some suggestion that the activity and/or selectivity is decreased at operating temperatures in the upper end of the temperature range normally employed for ammonia oxidation (800–1000° C.).

We have found that it is important that, in this type of catalyst, the bulk of the cobalt is present as a mixed oxide phase, e.g. as the Perovskite structure $RECoO_3$, (RE=rare earth), or a form thereof in which the oxygen is non-stoichiometric, and is not present as free cobalt oxides e.g. cobalto-cobaltic oxide $CoO_3O_4$ or cobalt monoxide CoO. We believe that it an appreciable proportion of the cobalt is present as the free oxides; in use at high temperatures, e.g. above about 850° C., the free cobalt oxides are able to catalyse the side reaction oxidations e.g. to nitrogen or nitrous oxide, whereas if the bulk of the cobalt is "locked" into a mixed oxide phase, such as the Perovskite structure, the oxidation capability is more limited to the desired oxidation.

Producing the catalyst simply by co-precipitation of the component oxides (or compounds that readily decompose thereto) or by evaporating a solution of a mixture of thermally decomposable salts, e.g. nitrates, of the desired metals, followed by calcination at moderate temperatures, e.g. 600–900° C., does not necessarily lock the bulk of the cobalt into a mixed oxide phase such as the Perovskite structure even if the components are present in the requisite proportions. Heat treatment of the product is necessary to obtain the desired structure. In the aforesaid CN-A-86108985 the catalysts were calcined at 900° C. for 5 hours prior to use; we believe that such heat treatment is inadequate, and treatment at higher temperatures and/or for longer times is required to minimise the quantity of free cobalt oxide present. However heating at too high a temperature, above about 1150° C., may give rise to decomposition of mixed oxide phases, releasing free cobalt oxides. Alternatively, or additionally, steps may be taken to remove free cobalt oxides from the composition: for example the composition may be washed with an ammoniacal solution or other solution containing a complexing agent for cobalt. Ethylene diamine tetra-acetic acid is an example of such a complexing agent.

Accordingly the present invention provides an oxidation catalyst comprising oxides of (a) at least one element A selected from rare earths and yttrium, and (b) cobalt, said cobalt and element A begin such proportions that the element A to cobalt atomic ratio is in the range 0.8 to 1.2, at least some of said cobalt and element A oxides being present as a mixed oxide phase with less than 30%, preferably less than 25%, of the cobalt (by atoms) being present as free cobalt oxides.

The catalyst thus contains at least one mixed oxide phase containing cobalt and at least one element A. The catalyst may also contain free element A oxides and/or one or more mixed oxide phases containing two or more elements A. The element A to cobalt atomic ratio is 0.8 to 1.2, particularly 1.0 to 1.2. Preferably less than 25% (by atoms) of the cobalt is present as free cobalt oxides, and in particular it is preferred that less than 15% (by atoms) of the cobalt is present as the cobalt monoxide, CoO. The proportion of the various phases may be determined by X-ray diffraction (XRF) or by thermogravimetric analysis (TGA) making use, in the latter case, of the weight loss associated with the characteristic thermal decomposition of $Co_3O_4$ which occurs at approximately 930° C. in air. Preferably than 10%, particularly less than 5%, by weight of the composition is free cobalto-cobaltic oxide end less than 2% by weight is free cobalt monoxide.

Preferably at least one element selected from yttrium, cerium, lanthanum, neodymium, and praseodymium is used as part or all of element A. Element A may comprise a mixture of at least one variable valency element Vv selected from cerium and praseodymium and at least one non-variable valency element Vn selected from yttrium and the non-variable valency rare earth elements such as lanthanum or neodymium. In particular it is preferred that the atomic proportions of variable valency element Vv to non-variable valency element Vn is in the range 0 to 1, party 0 to 0.3. It is preferred that most of the cobalt is present as a Perovskite phase $ACoO_3$, but where element A comprises two or more elements, e.g. Vv and Vn, it is not necessary that there is a mixed Perovskite phase, e.g. $Vv_xVn_{1-x}CoO_3$ where x is between 0 and 1. Thus there may be a Perovskite phase, e.g. $VnCoO_3$ or $VvCoO_3$, mixed with other phases such as $Vv_2O_3$, $Vn_2O_3$, $(Vv_xVn_{1-x})_2O_3$ or $Vv_xVn_{1-x}O_2$.

As indicated above the catalyst may be in a form wherein the amount of oxygen is non-stoichiometric. This arises from the variable valency of cobalt and also of any variable valency rare earth present as part, or all, of element A.

The catalyst may be formed by heating a composition containing the cobalt and element A oxides, preferably in air, to a temperature in the range 900–1200° C. in order to produce a material in which only a small proportion of the cobalt is present as free oxides.

The compositions may be made by precipitation, e.g. by adding a solution of soluble salts of the relevant metals to a solution of a base, e.g. ammonium carbonate or hydroxide, to precipitate the relevant metals as (basic) carbonates, hydroxides, or oxides followed by calcination to convert the precipitated compounds to the oxides. The use of alkali metal compounds as the base to effect precipitation is less preferred as they inevitably cause some contamination of the product with sodium which could act as a catalyst poison. The precipitation may alternatively, but less preferably, be effected by adding the base to the solution of the mixed salts. Alternatively, the composition may be made by forming a solution of thermally decomposable salts, e.g. nitrates or salts of organic acids, e.g. oxalates or citrates, of the metals in the appropriate proportions and evaporating the solution to dryness followed by calcination to effect decomposition to the appropriate oxides. Less preferably, the composition may be made by mixing preformed oxides of the metals in the appropriate proportions.

In another alternative sore or all of the element A material may be used as a support on to which the cobalt and any remaining element A is coated. Thus a finely divided element A oxide, e.g. ceria, may be impregnated with a solution containing a cobalt salt and possibly also an element A salt, e.g. a lanthanum salt, followed by decomposition of the cobalt and any element A salts. Alternatively, such a supported material may be made by precipitation by precipitating the cobalt and optionally some of the element A, as heat decomposable compounds on to a finely divided, e.g. precipitated, element A oxide or compound decomposable thereto.

Whichever route is used to make the oxides composition, the composition should be calcined. e.g. in air, at a high enough temperature for long enough to form sufficient material with a mixed oxide structure, e.g. the Perovskite structure, to combine most, if not essentially all, of the free cobalt oxides into one or more mixed oxide phases. As indicated above the calcination temperature is preferably in the range 900–1200° C. The duration of the heating required will depend on the temperature employed and on the route employed to make the composition. If the heating temperature is below 1100° C., heating for at last 6 hours is preferred. On the other hand the duration of heating at a temperature above 1150° C. is preferably less than 6 hours in order to minimise the decomposition of cobalt oxide containing phases into free cobalt monoxide. However catalysts prepared by evaporating a solution containing a mixture of organic salts, e.g. citrates, of the relevant metals to dryness followed by calcination may require heat treatment for shorter times and/or at temperature 200–300° C. below the temperatures required for compositions made for example by precipitation. On the other hand if the catalyst is made by calcining a mixture of preformed oxides, longer times and/or higher temperatures may be required to produce a material in which only a small proportion of the cobalt is present as free oxides.

In the aforesaid CN-A-86108985 the catalysts were tested on a small scale with the catalysts in the form of a bed of a coarse powder.

For practical reasons it is not desirable to employ a bed of a powdered catalyst in a full size ammonia oxidation plant: desirably the catalyst should be in a form such that it is a direct replacement for the precious metal meshes or gauzes conventionally used.

It has been proposed in Czech patent CS 266106 to employ a catalyst in the form of a stainless steel mesh bearing a coating of a mixture of cobalt oxide promoted with small amounts of ceria, chromia and/or alumina. However, such catalysts, which contain far more cobalt than is required for the Perovskite structure, and will inevitably contain substantial proportions of free cobalt oxides.

In order to generate adequate catalyst surface area when using a wire support it is necessary to give the support a ceramic coating, termed a wash coat, and the active material is then deposited on this wash coat. Normally alumina or lanthana compositions are used as such wash coats. However, with conventional high temperature steel supports, there is a risk that material of the wash coat, or impurities remaining therein, e.g. alkali, resulting from the use of alkali aluminate solutions to form the wash coat, may in use gradually diffuse into the active material, upsetting the desired structure, and interfering with the catalytic performance.

We have found however that by the use of primary supports made from a high temperature, aluminum containing, ferritic alloy, it is possible to obtain good adhesion of the wash coat to the primary support without the use of alkaline wash coat solutions and so the problem of migration of alkali impurities into the active catalysts may also be avoided.

Catalytic processes using a bed of random packed catalyst support units having a plurality of through passages and on which the catalyst is supported and in which the support units may be made from such alloys have been proposed in GB-A-2077136. That reference lists ammonia oxidation as an example of a catalytic process for which such units may be used. That reference also refers to GB-1568861 for methods of applying a suitable wash coat which does not involve the use of alkaline wash coat solutions.

Suitable iron/aluminium alloys are those described in the aforesaid GB-A-2077136, and in particular are those of the weight composition

| | | | |
|---|---|---|---|
| chromium | 10–25% | aluminium | 3–6% |
| yttrium and/or cerium | 0–1% | cobalt | 0–5% |
| carbon | 0–0.5% | Iron (and usual impurities) | balance |

The presence of yttrium and/or cerium is preferred as these exert a stabilising effect on the alumina formed upon calcining the alloy or final catalyst. The presence of cobalt may also be desirable to minimise migration of components from the alloy or wash coat into the active catalyst: preferred alloys contain 15–25% chromium, 4–6% aluminum, 0.3–1% yttrium, cerium, and/or 1–3% cobalt, 0–0.5% carbon, balance iron and the usual impurities.

In the present invention it is preferred that the catalyst is made by forming a gauze, mesh, or pad of wires of a iron/aluminium alloy, applying a wash coat of alumina, ceria, zirconia, or lanthana for example as described in GB-A-1568861, and then applying a dispersion containing the active oxides composition ion or a solution of compounds decomposable to the active oxides. The wash coat is preferably applied to the alloy after effecting surface oxidation of the alloy by calcining the alloy in air at e.g. 1000° C. The wash coat is preferably applied as a sol and, where an alumina wash coat is employed, preferably also contains yttria and/or ceria. The coated gauze, mesh, or pad is then subjected to the calcination in air at high temperature to reduce the amount of free cobalt oxides. At the same time this calcination will effect some sintering between adjacent coated wires to bond the gauze, mesh or pad into a strong structure at points where adjacent wires filaments contact one another.

During this calcination of the final composition at high temperature to form the desired mixed oxide structure with minimal free cobalt oxides, it is found that the alumina, and lanthana, if used as the wash coat, are present as diffuse layers extending into adjacent components but are thereafter relatively stable so that little further migration occurs during use.

Instead of using a metallic primary support, a pad, mesh, or gauze formed from ceramic, e.g. alpha alumina, fibres or filaments e.g. by weaving may be employed; such a ceramic primary support may have a wash coat secondary support as aforesaid.

Alternatively, instead of using a gauze, mesh or pad, there may be employed a monolithic support in the form of a honeycomb or foam of a ceramic material such as alumina or zirconia, or a monolithic structure formed from an iron/aluminium alloy e.g. as proposed in GB-A-2077136 but not necessarily employed as a random packed bed of units as proposed in GB-A-2077136. Thus monolithic structures may be used with their passages oriented at preset angles to the gas flow direction. Such monolithic supports may again have a wash coat secondary support as described above.

Accordingly the present invention further provides an oxidation catalyst comprising a primary support in the form of a mesh, gauze, pad, or monolith formed from a high temperature iron/aluminium alloy or a mesh, gauze, pad, monolith, or foam of a ceramic material, a secondary support in the form of an alkali-free alumina or lanthana wash coat on said primary support; and, supported on said secondary support, an active coating of oxides of (a) at least one element A selected from rare earths and yttrium, and (b) cobalt, said cobalt and element A being in such proportions that the element A to cobalt atomic ratio is in the range 0.8 to 1.2, at least some of said cobalt and element A oxides being present as a mixed oxide phase with less than 30, preferably less than 25%, of the cobalt (by atoms) being present as free cobalt oxides.

Where a ceramic honeycomb or foam is employed, it may itself be formed from the catalytic composition, thus avoiding the need for a separate support material.

The catalysts of the invention, particularly those in the form of gauzes, meshes, or pads, may be used as a direct replacement for the conventional precious metal catalysts with essentially no modification to the ammonia oxidation process, except of course the conventional precious metal trap arrangements can be eliminated. In the oxidation of ammonia to nitric oxide for the manufacture of nitric acid, the oxidation process may be operated at temperatures of 800–1000° C., particularly 850–950° C., pressures of 1 to 15 bar abs., with ammonia in air concentrations of 5–15%, often about 10%, by volume.

In addition for use for ammonia oxidation reactions, the catalysts may also be of use for other oxidations.

The invention is illustrated by the following examples.

EXAMPLE 1

A catalyst was made by mixing a solution of lanthanum, cerium, and cobalt nitrates in such proportions to give 3 atoms of lanthanum and 4 atoms of cobalt per atom of on. The solution was evaporated to dryness and the resulting powder calcined in air at 1100° C. for 8 hours to give a mixed oxide structure. TGA indicated that 5.8% of the cobalt atoms were present as free cobalt oxide.

A second catalyst was prepared by the same route but omitting the cerium nitrate and using such proportions that there was one lanthanum atom per cobalt atom. TGA indicated that 13.3% of the cobalt atoms were present as fee cobalt oxide.

The catalysts were tested by placing about 0.1 g of the resulting powdered catalyst in a microreactor tube and passing a mixture of helium containing 5% by volume of ammonia and 10% by volume of oxygen through the microreactor tube at a linear velocity of 5000 m/hr. This corresponded to a space velocity of $1.8 \times 10^6$ $h^{-1}$. The temperature was then raised from 100° C. to 1000° C. at a rate of 30° C./min and the exit gas analysed at various temperature For purposes of comparison, a pad (0.13 g) of 5 layers of a platinum/rhodium gauze (which had been found to give optimum selectivity for the oxidation of ammonia to nitric oxide), was tested under the same conditions.

The selectivity, defined as $[NO]/([NO]+2[N_2])$, where $[NO]$ and $[N_2]$ respectively represent the volume proportions of nitric oxide and nitrogen in the exit gas, at various temperatures is shown in the following table.

| Temperature | Selectivity (%) | | |
| --- | --- | --- | --- |
| (° C.) | La/Ce/Co (3:1:4) | La/Co (1:1) | Pt/Rh |
| 800 | 95.6 | 94.4 | 95.8 |
| 850 | 95.2 | 93.1 | 96.0 |
| 900 | 94.3 | 93.5 | 96.1 |
| 950 | 92.9 | 92.4 | 94.4 |
| 1000 | 89.7 | 89.6 | 89.5 |

EXAMPLE 2

A mixture of lanthanum, cerium and cobalt compounds was precipitated by the step-wise addition of a solution containing lanthanum, cerium and cobalt nitrates in the atomic proportions La:Ce:Co 4:1:5 to a precipitant solution comprising a mixture of ammonium carbonate and oxalic acid. Throughout the precipitation the mixture was continually stirred, the pH maintained at between 6 and 7, and the temperature between 48 and 57° C. The suspension was then allowed to stand and a flocculated precipitate was observed to form. The supernatant liquor was deep pink in colour, indicating that not all the cobalt had precipitated. The precipitate was filtered off, dried in air at 120° C. for 6 hours and then calcined in air at 600° C. for a further 6 hours. The calcined material was split into a number of portions each of approximately 10 g.

One portion was calcined in air at 900° C. for 6 hours. The other portions were calcined in air at 1000° C., 1100° C., 1200° C., 1300° C. and 1400° C. respectively. Chemical analysis of the sample calcined at 900° C. revealed that the atomic ratios of the metals was La:Ce:Co 4.6:1.06:5, i.e. having a rare earth to cobalt atomic ratio of about 1.13, which is consistent with the observation that not all of the cobalt had precipitated. XRF analysis showed that cobalt represented 22.6% by weight of the catalyst.

XRD analysis of the portions calcined at the different temperatures was performed, using silica as an internal standard, to determine the proportions of cobalto-cobaltic oxide and cobalt monoxide present. From this data, the atomic proportion of the cobalt present as free cobalt oxides was calculated. The results are shown in the following table.

| Calcination temperature (° C.) | Weight % CoO | Weight % Co₃O₂ | % Co as free oxides |
|---|---|---|---|
| none | 0 | 27 | 88 |
| 900 | 0 | 17 | 55 |
| 1000 | 0 | 6 | 20 |
| 1100 | <1 | 4 | <17 |
| 1200 | <1 | 3 | <14 |
| 1300 | 2 | 3 | 17 |
| 1400 | 4 | 2 | 21 |

Electron microcopy studies indicate that none of the samples contained a mixed lanthanum/cerium/cobalt Perovskite phase, although it is possible that the lanthanum/cobalt Perovskite $LaCoO_3$ present in the samples calcined at 900° C. and above contained a small proportion (less than about 2%) of cerium. However many of the particles were observed, by electron microscopy, to have the lanthanum/cobalt Perovskite phase attached to, or coated on, particles of cerium oxide and/or lanthanum doped cerium oxide.

From this data it would appear that the cobalt monoxide observed in the samples calcined at high temperatures might result from decomposition of the lanthanum/cobalt Perovskite and/or cobalto/cobaltic oxide: other studies have shown that cobalto-cobaltic oxide reversibly decomposes forming cobalt monoxide at about 930° C.

The calcined samples were tested for their selectivity for ammonia oxidation by the method described in Example 1 above, except that after increasing the temperature to 1000° C., the temperature was maintained at this level for 10 minutes and then decreased at about 30° C. per minute. Exit gas analyses were performed both during increasing and decreasing the temperature. The results are shown in the following table.

test procedure, undergoing the reversible transition back to cobalto-cobaltic oxide as the temperature falls.

EXAMPLE 3

About 20 kg of catalyst was prepared by the method described in Example 2 with the final calcination at 900° C. for 6 hours. XRF showed that the atomic ratios of the metals was La:Ce:Co 8.54:2.08:10. TGA revealed that 23.8% of the cobalt atoms were present as free cobalt oxides.

The catalyst was formed into small cylindrical pellets and a sample of the pellets were subjected to selectivity testing by the procedure of Example 2. The selectivity at a test temperature of 900° C. was 92%.

The remainder of the catalyst pellets were then supported on a wire mesh as the catalyst in the ammonia oxidation reactor of a commercial nitric acid plant which was then operated under typical nitric acid plant operating conditions (11–12% ammonium in air; 1.1 bara operating pressure; 200° C. inlet temperature; and 910–925° C. exit temperature) for 6 months. A sample of the catalyst was then taken for analysis and selectivity testing by the procedure of Example 2. TGA revealed that only 5.7% of the cobalt atoms were present as free cobalt oxides, and the selectivity at a test temperature of 900° C. was 96%.

These data show that the level of free cobalt oxide present in the catalyst decreased significantly during the first 6 months of operation at elevated temperature accompanied by an increase in selectivity. The performance of the catalyst after 6 months operation is similar to that of a fresh platinum/rhodium gauze catalyst.

Operation of the ammonia oxidation process was then continued for a further 6 months under the same conditions as before and then a further sample was analysed, showing that 5.5% of the cobalt atoms were present as free cobalt oxides. This indicates that the free cobalt oxide content had stabilized with only a very small further decrease occurring during the second 6 month period of operation.

| Test Temperature (° C.) | Selectivity (%) to NO on sample calcined at | | | | | |
|---|---|---|---|---|---|---|
| | 900° C. | 1000° C. | 1100° C. | 1200° C. | 1300° C. | 1400° C. |
| increasing | | | | | | |
| 800 | 93.4 | 93.3 | 94.9 | 93.3 | 92.4 | 84.0 |
| 850 | 93.5 | 92.0 | 94.7 | 91.6 | 90.1 | 85.2 |
| 900 | 92.4 | 91.8 | 93.4 | 91.9 | 88.8 | 83.0 |
| 950 | 89.0 | 90.9 | 93.0 | 90.2 | 85.7 | 79.0 |
| 1000 | 84.9 | 87.4 | 91.8 | 86.5 | 80.7 | 69.1 |
| decreasing | | | | | | |
| 1000 | 80.0 | 86.4 | 91.1 | 86.4 | 67.0 | 38.5 |
| 950 | 85.6 | 88.0 | 93.2 | 88.9 | 80.2 | 64.6 |
| 900 | 89.1 | 90.3 | 93.3 | 90.8 | 88.5 | 66.0 |
| 850 | 89.7 | 90.7 | 94.3 | 91.3 | 89.2 | 65.5 |
| 800 | 94.9 | 94.3 | — | 92.0 | 89.4 | 60.0 |

From this data it is seen that there is a decrease in selectivity at high operating temperatures (above about 900° C.) for those samples having the larger proportions of the cobalt as free cobalt oxides. The poorer selectivity of the samples in the cooling cycle as opposed to the heating cycle probably results from decomposition of free cobalto-cobaltic oxide to the less selective cobalt monoxide at the high operating temperatures: this difference between the heating and cooling cycle data is less apparent at the lower operating temperatures, possibly as a result of free cobalt monoxide, formed during the higher temperature part of the

What is claimed is:

1. A process for the oxidation of ammonia which comprises reacting ammonia and air in the presence of an oxidation catalyst comprising oxides of (a) at least one variable valency element Vv selected from the group consisting of cerium and praseodymium and at least one non-variable valency element Vn selected from the group consisting of yttrium and a non-variable valency rare earth element, and (b) cobalt, said cobalt and elements Vv and Vn being in such proportions that the (element Vv plus element Vn) to cobalt atomic ratio is in the range 0.8 to 1.2, and at least some of said cobalt and element Vv and element Vn oxides are present as a mixed oxide phase with less than 30% of the cobalt (by atoms) being present as free cobalt oxides.

2. A process according to claim 1 wherein less than 25% of the cobalt (by atoms) is present as free cobalt oxides.

3. A process according to claim 1 wherein less than 15% (by atoms) of the cobalt is present as cobalt monoxide.

4. A process according to claim 1 wherein less than 5% by weight of the composition is free cobalto-cobaltic oxide and less than 2% by weight is free cobalt monoxide.

5. A process according to claim 1 wherein element Vn is selected from the group consisting of yttrium, lanthanum and neodymium.

6. A process according to claim 1 wherein the atomic proportions of variable valency element Vv to non-variable valency element Vn is in the range 0 to 0.3.

7. A process according to claim 1 wherein the oxidation catalyst is obtained by heating a composition containing oxides of cobalt and the elements Vv and Vn, to a temperature in the range 900–1200° C.

8. A process according to claim 1 wherein the oxidation catalyst comprises a primary support in the form of a mesh, gauze, pad, or monolith formed from a high temperature iron/aluminum alloy or a mesh, gauze, pad, monolith, or foam of a ceramic material, a secondary support in the form of an alkali-free alumina or lanthana wash coat on said primary support; and, supported on said secondary support, an active coating of said oxidation catalyst.

* * * * *

UNITED STATES PATENT AND TRADEMARK OFFICE
CERTIFICATE OF CORRECTION

PATENT NO. : 6,827,917 B1
DATED : December 7, 2004
INVENTOR(S) : Ward et al.

It is certified that error appears in the above-identified patent and that said Letters Patent is hereby corrected as shown below:

Title page,
Item [63], Related U.S. Application Data, please correct to read as follows:
-- [63] Continuation of application No. PCT/GB97/03193, filed on November 20, 1997. --

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,827,917 B1  Page 1 of 1
APPLICATION NO. : 09/334986
DATED : December 7, 2004
INVENTOR(S) : Ward et al.

It is certified that error appears in the above-identified patent and that said Letters Patent is hereby corrected as shown below:

Column 1, line 26 – change "revered" to --recovered--

Column 1, line 54 – change "$CoO_3O_4$" to --$Co_3O_4$--

Column 1, line 55 – change "it" to --if--

Column 2, line 41 – change "Preferably than" to --Preferably less than--

Column 2, line 43 – change "end" to --and--

Column 3, line 23 – change "sore" to --some--

Column 3, line 45 – change "last" to --least--

Column 4, line 59 – delete "ion"

Column 5, line 63 – change "on" to --cerium--

Signed and Sealed this

First Day of January, 2008

JON W. DUDAS
*Director of the United States Patent and Trademark Office*